United States Patent [19]
Gervais et al.

[11] 4,352,004
[45] Sep. 28, 1982

[54] JOINING PROCESS

[75] Inventors: Yvon Gervais, Saint Martin D'Heres; Renen Gillet, Grenoble; Georges Tanis, Meylan, all of France

[73] Assignee: Commissariat a l'Energie Atomique, Paris, France

[21] Appl. No.: 169,780

[22] Filed: Jul. 17, 1980

[30] Foreign Application Priority Data

Jul. 18, 1979 [FR] France .................. 79 18609

[51] Int. Cl.³ ........................................... B23K 15/00
[52] U.S. Cl. .......................... 219/121 ED; 219/118
[58] Field of Search .............. 219/121 LC, 121 LD, 219/121 EC, 121 ED, 118, 77

[56] References Cited

U.S. PATENT DOCUMENTS

| 2,937,262 | 5/1960 | Baxter | 219/118 X |
| 3,794,807 | 2/1974 | Bailey et al. | 219/121 ED |
| 3,808,395 | 4/1974 | Bailey et al. | 219/121 ED |
| 4,203,020 | 5/1980 | Armbruster et al. | 219/118 X |

*Primary Examiner*—C. L. Albritton

[57] ABSTRACT

Process for joining by electron beam bombardment a copper member to a member made from a refractory metal, wherein a layer of metal chosen from among the group containing chrome and nickel is deposited on the copper member in the area where the electron beam brings about its fusion.

The members joined by the process of the invention can in particular be used under ultravacuum conditions and in electric power applications.

4 Claims, 1 Drawing Figure

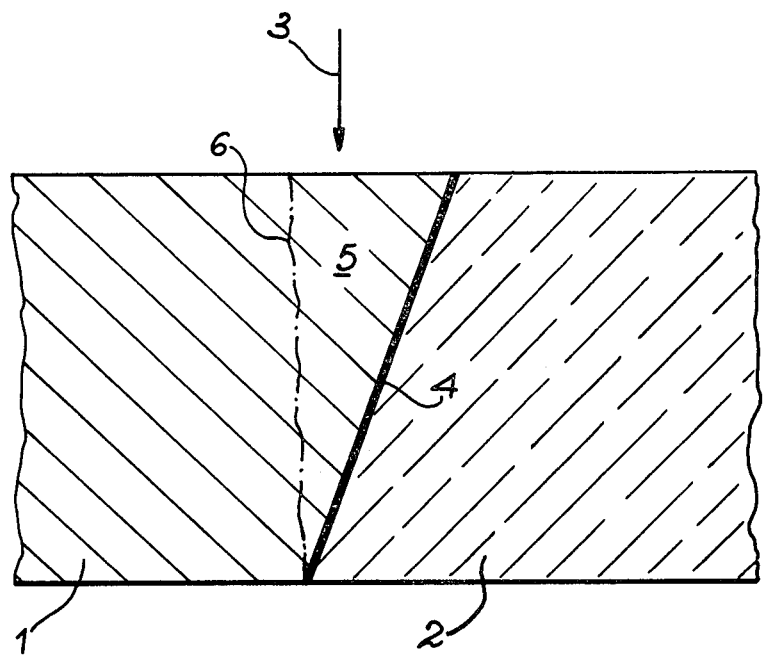

JOINING PROCESS

BACKGROUND OF THE INVENTION

The present invention relates to a process for joining, by bombardment with an electron beam, a copper member with a member made from a refractory metal or an alloy of refractory metals with a local supply of chrome or nickel. This process makes it possible to produce a defect-free welded joint and is more particularly intended for use in the electrical engineering field.

As is known, it is difficult to make a joint between a copper member and a member made from a refractory metal or an alloy of refractory metals, this being more particularly due to the great difference between the fusion temperatures of the two metals to be assembled. However, for certain applications, top quality joints are required. This problem occurs, for example, when assembling circuit breaker members, one of which is made from a pseudo-alloy of copper and tungsten and the other from copper or a copper alloy. The assemblies produced by the prior art processes are not reliable and do not make it possible to envisage any increase in the breaking capacity of the circuit breakers, this being desired by all designers.

The known processes in volve on the one hand torch brazing and on the other welding by electron beam bombardment. The latter process comprises melting the copper part in such a way that it becomes attached to the molybdenum part in order to bring about a metallurgical joint identical to that obtained in a brazed joint. However, neither of the said two known processes gives satisfactory results. The ordinary copper-refractory metal welds produced by electron beams are not of top quality. They have compactness defects, such as porosities, wettability defects leading to an incomplete joint and relatively poor mechanical and thermal properties.

BRIEF SUMMARY OF THE INVENTION

The present invention relates to a process for joining by electron beam bombardment, a copper member and a member made from a refractory metal having a defect-free joint between said two members.

According to the process of the invention, a layer of chrome or nickel is deposited on the copper member in the area where the electron beam brings about the fusion thereof.

Preferably, the thickness of the metal layer deposited on the copper member in such that there is at least 0.5% chrome and at least 3% nickel in the alloy resulting from the fusion brought about by the electron beam.

The results obtained by means of the process of the invention are further improved if the ends of the parts to be assembled are especially prepared. Thus, the geometry of the end of the parts produced from a refractory metal is perfectly adapted to the geometry of the fusion area and the wettability is more complete over the entire thickness of the refractory metal wall.

For this reason, a chamfer inclined by about 10° is made on the ends of the parts to be assembled whereby the latter are contiguous at the time of making the weld. The chamfer angle value is between 0° and 10° and depends on the shape of the fusion area. Examples of refractory metals are molybdenum, tungsten, niobium, tantalum and alloys thereof.

As a result of the better quality of the joint obtained by the process according to the invention, it is possible to envisage the use of the thus assembled members in ultravacuum and in electric power applications. Thus, the compactness of the joint eliminates redhibitory degassing processes in ultravacuum applications and the absence of adhesion between the assembled parts permits the passage of high electric currents and heat fluxes through the interface.

DESCRIPTION OF THE DRAWING AND PREFERRED EMBODIMENTS

Other features and advantages of the joining process according to the invention can be gathered from the following non-limitative description with reference to the single FIGURE, which is a sectional view of the joint plane of a copper member and a molybdenum member assembled by the process of the invention.

In the drawing, reference numeral 1 designates the copper member and reference numeral 2 the molybdenum member. The ends of these two members which it is desired to assemble have been previously prepared. A chamfer inclined by about 10° is prepared on each of them. The inclination angle value of the joint plane is between 0° and 10° and is dependent on the shape of the fusion area obtainable by the welding apparatus as a result of the electron beam used. Arrow 3 symbolizes the electron beam. It should be noted that this electron beam is placed above the copper member so as to bring about the fusion of this metal only. According to the process of the invention, there is a chrome or nickel supply 4 to the area 5, whose fusion is brought about by electron beam 3. This supply 4 can be provided by electrolytic deposition or by evaporation. The thickness of the deposit is such that in the area 5 defined by dotted line 6 and whose fusion is brought about, there is a chrome content of at least 0.5% and a nickel content of at least 3%. The best results are obtained for chrome with a content of 0.7%.

The joint obtained in this way between the copper member and the molybdenum member makes it possible to obtain a sound joint without defects, such as porosities or a lack of adhesion. It is therefore possible to use the thus assembled members in ultravacuum and electric power applications.

EXAMPLE I

As an example, the joint between members for a circuit breaker was produced by the process according to the invention. Two tubes with an internal diameter of 19 mm and an external diameter of 31 mm, made on the one hand from copper and on the other from a pseudo-alloy of tungsten containing 20% copper were welded together. Two tubes with an internal diameter of 28 mm and an external diameter of 48 mm were also joined.

EXAMPLE II

A molybdenum disk with a diameter of 180 mm and a thickness of 2 mm was welded by the process according to the invention to a copper ring with an internal diameter of 180 mm, an external diameter of 220 mm and a thickness of 3.5 mm.

What is claimed is:

1. A process for joining by electron beam bombardment a copper member to a member made from a refractory metal, wherein a layer of metal selected from the group consisting of chrome and nickel is deposited on the copper member in the area where the electron beam brings about fusion, said refractory material being selected from the group consisting of molybdenum, tungsten, niobium, tantalum, and alloys thereof.

2. A joining process according to claim 1, wherein the thickness of the chrome layer deposited on the copper member is such that the chrome content in the alloy resulting from the fusion caused by the electron beam is at least 0.5%.

3. A joining process according to claim 1, wherein the thickness of the nickel layer deposited on the copper layer is such that the nickel content of the alloy resulting from the fusion caused by the electron beam is at least 3%.

4. A joining process according to claim 1, wherein a chamfer inclined by an angle of about 10° is made on each of the ends of the members to be assembled, whereby the latter are contiguous at the time of welding.

* * * * *